(12) United States Patent
Ring

(10) Patent No.: US 6,621,453 B2
(45) Date of Patent: Sep. 16, 2003

(54) SATELLITE ATTITUDE ADJUSTMENT FOR GPS INITIALIZATION

(75) Inventor: Jeffrey R. Ring, Pinellas, FL (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/960,241

(22) Filed: Sep. 21, 2001

(65) Prior Publication Data

US 2003/0058161 A1 Mar. 27, 2003

(51) Int. Cl.[7] .............................. G01S 5/02; H04B 7/185
(52) U.S. Cl. .................... 342/357.11; 244/164; 244/171
(58) Field of Search ....................... 342/357.11; 244/171, 244/164

(56) References Cited

U.S. PATENT DOCUMENTS

| 5,959,576 A | * | 9/1999 | Ring | 342/357.11 |
| 6,142,423 A | * | 11/2000 | Wehner | 244/164 |
| 6,295,021 B1 | * | 9/2001 | Lichten et al. | 342/355 |
| 6,330,987 B1 | * | 12/2001 | Scott | 244/164 |

* cited by examiner

Primary Examiner—Theodore M. Blum
(74) Attorney, Agent, or Firm—Matthew S. Luxton

(57) ABSTRACT

By using the GPS satellite transmitted signals that are tracked on a satellite and those that should be tracked but are not due to the attitude of the satellite and rotating the satellite, two estimations of satellite attitude are made that are used to change the satellite attitude so that all the GPS signals are tracked.

8 Claims, 4 Drawing Sheets

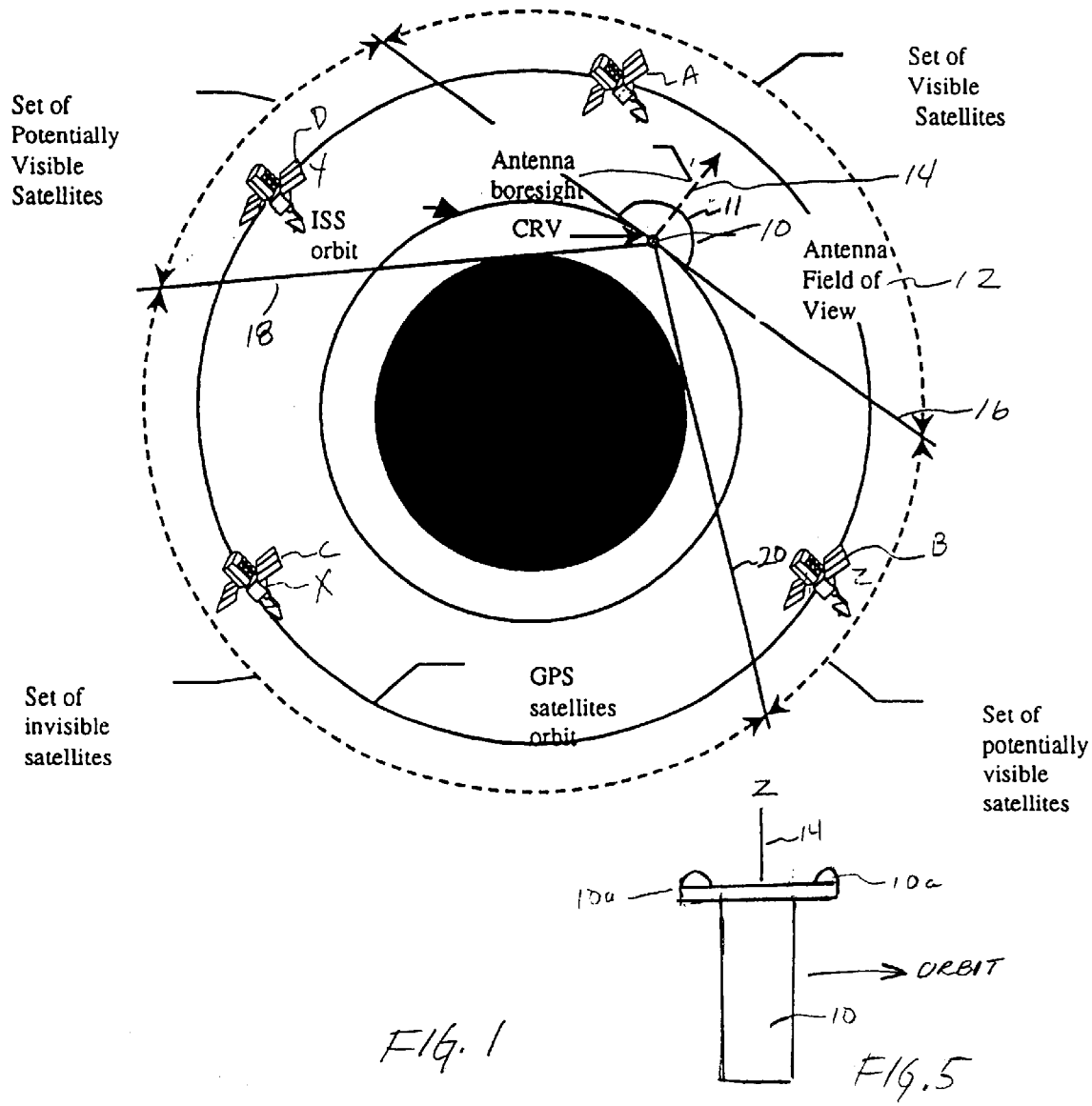

SATELLITE ATTITUDE ADJUSTMENT FOR GPS INITIALIZATION

BACKGROUND

This invention relates to satellites, particularly, using the global positioning system (GPS) for attitude control.

Global positioning system are extraordinarily accurate, employing a constellation of GPS satellites that transmit signals which a GPS receiver uses to determine position, in earth coordinates, and altitude. As explained in my U.S. Pat. No. 5,959,576, the attitude of an orbiting satellite can be regulated by communicating with and targeting one or more of the GPS satellites, a process that involves determining the elevation and azimuth to the GPS satellites and transforming earth-based GPS coordinates to space coordinates and using the on-board attitude control system, inertial measurement unit (IMU) control and momentum devices with thrusters.

Any use of GPS receivers with attitude capability requires a "Attitude initialization" sequence, the interval before the GPS receiver has resolved cycle ambiguity for accurate attitude determination. Special problems can arise, however, when a vehicle is launched from another vehicle in space, for instance CRV (crew recovery vehicle) launched from a space station to rapidly return a crew to earth. When the satellite is launched it may not be oriented with the GPS antennas pointed along zenith, and consequently the on-board GPS receivers cannot properly initialize attitude.

SUMMARY OF THE INVENTION

An object of the present invention is to provide a technique for adjusting to the satellite's attitude so that the proper number of GPS satellites are received to initialize the on-board GPS receivers.

According to the invention, when the satellite is launched the GPS satellites that should be within the antenna's filed of view (potential satellites) should be visible, are known from either an on-board processor or up linked data from a ground-based control. Using the GPS satellites that should be visible (the potential satellites) and those that are actually being tracked, an antenna bore-sight orientation is determined using the tracked GPS satellites position and the position, velocity and time of the spacecraft. The result is an antenna bore-sight estimation. Based on this estimation, the satellite is rotated (e.g. 90 degrees relative to the antenna bore sight) bringing into view other GPS satellites from which a second bore-sight estimation is obtained. A good estimate of the 3-axis attitude is obtained from these two vector observations plus the knowledge that the antenna bore-sight vector is aligned along the spacecraft Z axis. From these factors spacecraft's attitude is ascertained and then an attitude control system, employing an inertial measurement unit and thrusters or momentum devices, is controlled to reoriented satellite so that the bore-sight vector points to the zenith. The desired attitude or attitude change to align the GPS antennas with zenith is determined on-board and appropriate commands are provided to the attitude control to cause the thrusters or momentum devices to change the satellite attitude to the desired attitude where the GPS receiver antennas are properly oriented, along zenith, to allow full GPS receiver initialization.

Objects, benefits and features of the invention will apparent to one of ordinary skill in the art from the drawing and description.

BRIEF DESCRIPTION OF THE DRAWING

FIG. 1 shows a constellation of GPS satellites in order around the earth and their relationship to the antenna bore-sight and antenna field of view of a CRV vehicle also in orbit.

DESCRIPTION

Figures 2, 4:
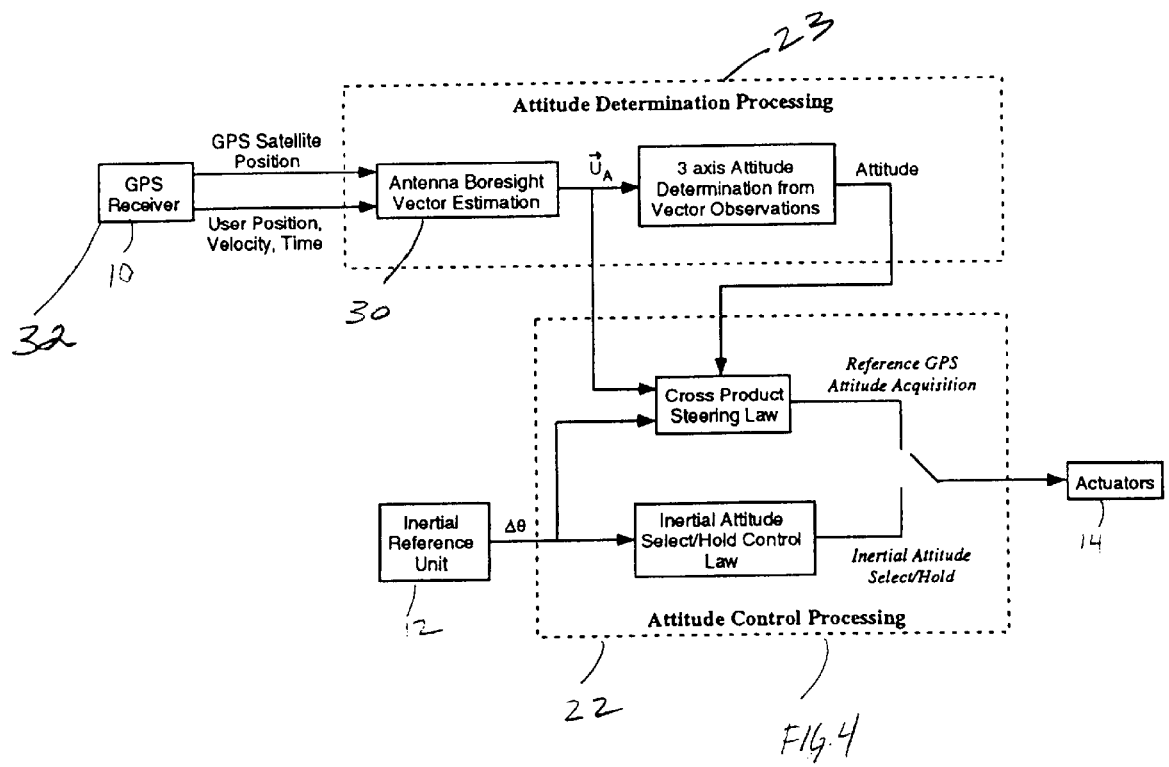
FIG. 2 is a block diagram of an attitude determination and control system using a GPS receiver plus processing sequences in conjunction with an inertial reference unit to control vehicle actuators such as momentum devices or thrusters.
FIG. 4 is a functional block diagram of a cross product steering control for controlling pitch, roll and yaw.

In FIG. 1, GPS satellites A, B, C, and D, orbit the earth, and another spacecraft or satellite, in this example a recovery user vehicle CRV 10, is in a lower orbit. The user vehicle or satellite 10 can be assumed to contain one or more GPS receivers 32 (in FIG. 2) with a hemispherical field of view 12 about an antenna bore-sight 14 that is ideally perpendicular to the antenna horizon 16. FIG. 5 shows that the GPS antennas 10a are arranged on a common plane, all aligned along the satellite Z axis 14. The Z axis may initially be oriented in any spherical direction when the satellite 10 is launched. The object of the invention is to lead to the reorientation of the satellite using only the GPS satellites, so that it is oriented with its Z axis, as shown in FIG. 1. For purposes of discussion, FIG. 1 shows the satellite 10 properly oriented for GPS attitude initialization with the satellites B and D below its field of view. Satellites B and D are below the horizon 16 but are potentially visible to the satellite 10 when reoriented so that the horizon coincides with either horizon 18 or 20. The GPS satellite C is in the set of invisible satellites. Regardless of user satellite orientation, the earth will occlude satellite C's transmitted GPS signal. GPS Satellites B and D are in the set of potentially visible satellites; that is, satellites that could be visible if the satellite is correctly oriented off zenith. GPS Satellite A is in the set of visible satellites, whose GPS signals are received.

The on-board GPS receivers 32 are capable of carrier phase based attitude determination. GPS cycle ambiguity resolution uses a constrained space solution method. The antenna subsystem consists of the four patch, similar antennas 10a all oriented along the spacecraft Z body axis which ideally points in the zenith direction 14.

A GPS carrier phase-based attitude determination requires finding the integral number of wavelengths that lie between a given pair of antennas in the direction of a given GPS satellite. This cycle ambiguity must be resolved initially before GPS attitude can be obtained. There are two basic methods for resolving cycle ambiguity: 1) search; 2) motion. The GPS receivers 32 use the search method to resolve cycle ambiguity. Some search methods require that the GPS antenna array be pointed within a predefined angle of a reference attitude. It will be seen from this discussion that the invention provides a means for reorienting the spacecraft to ensure that the GPS antenna bore-sight vector, arrow 14 in FIG. 1, can be assumed to lie within the specified pointing constrained region. Additionally, this discussion will explain that the spacecraft is reoriented by employing a vector cross-product steering law (known in to be prior art) that computes actuator commands that rotationally maneuver the satellite 10 to align the bore-sight of GPS antennas 10a along the zenith vector, perpendicular to the tangent of the orbit (along a line passing through the vehicle and the center of the earth). Knowledge of where the GPS antennas are pointed, it will be demonstrated, is based on visibility checking GPS satellites within the constellation of GPS satellites. Antenna bore-sight vectors are obtained before and after one time 90 degree roll maneuver along the Z axis for estimating the spacecraft attitude Ψ. The yaw attitude (rotation about the antenna bore-sight axis, the z axis) is used to allocate cross-product steering errors of the pitch, yaw and roll actuator commands that control attitude controlling actuators, e.g. thrusters or momentum devices.

Figure 3:
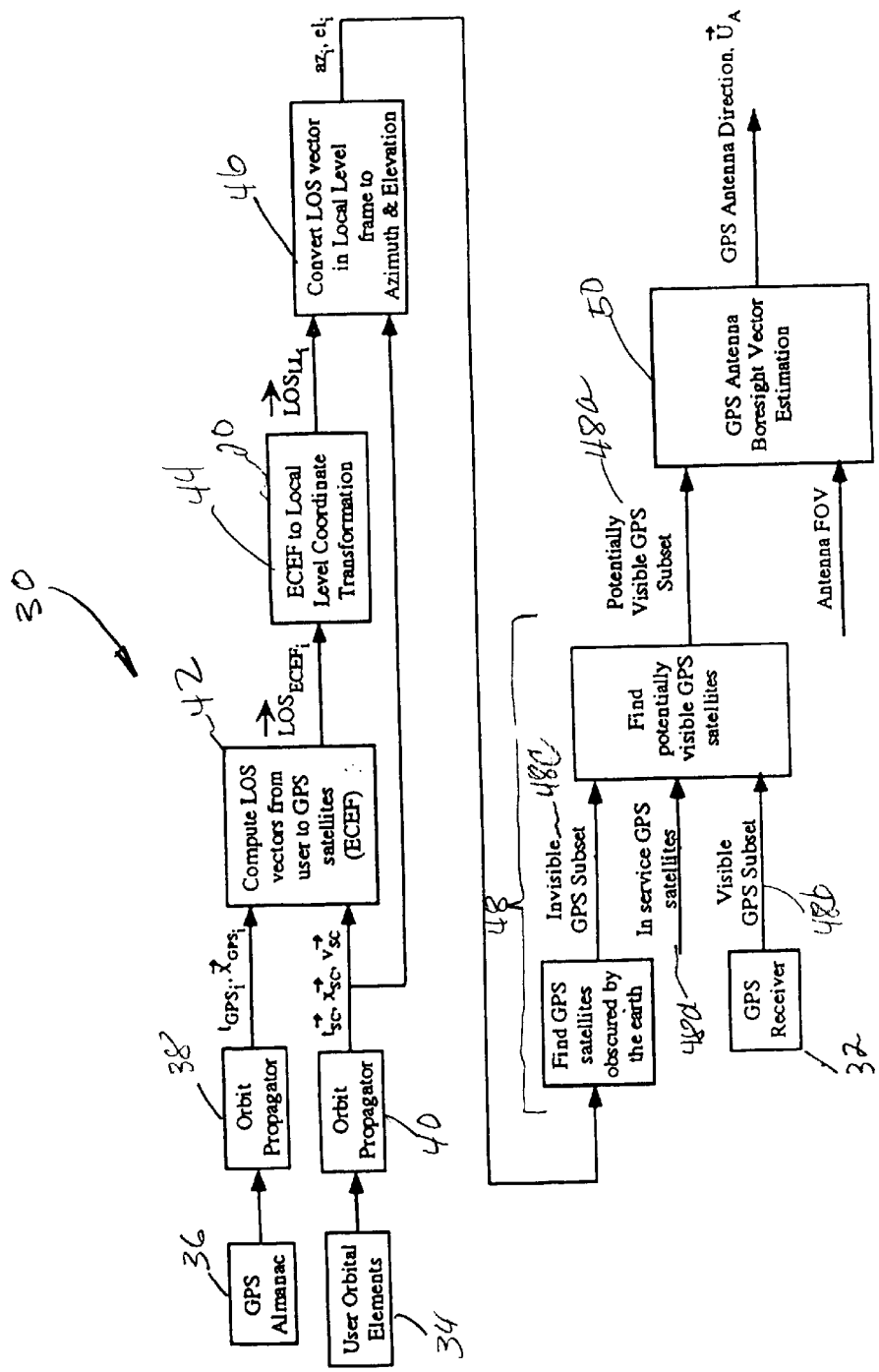
FIG. 3 is a functional block diagram of the attitude determination processing portion of the attitude determination and control system shown in FIG. 2 that uses on-board GPS almanac and user orbital elements to produce the GPS antenna bore-sight estimation.
Figure 4:
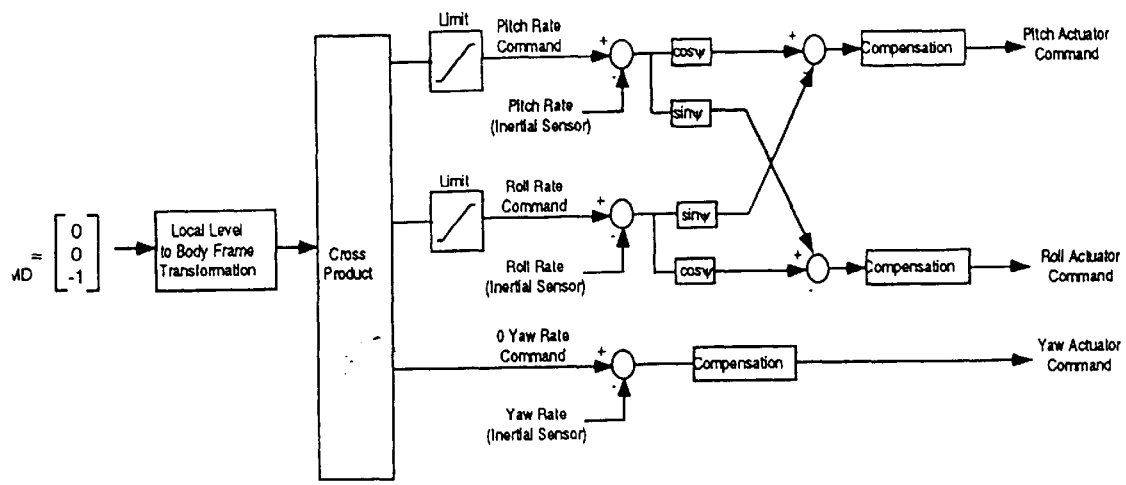

In FIG. 2, the attitude control system 22 is initially engaged in an inertial attitude select/hold mode (maintain initial attitude) while the attitude determination subsystem 23 estimates the bore-sight vector $U_A$ using step 30 in FIG. 3. The GPS satellites are grouped into three subsets—visible, invisible and potentially visible. Referring to FIG. 3, the visible satellites subset consists of those GPS satellites that are currently tracked by the GPS receiver 32, such as satellite A; the invisible subsets consists of those GPS satellites obscured by the earth, such as satellite C; the potentially visible subset of GPS satellites is determined by propagating the user and GPS satellites positions using orbital elements 34 and GPS almanac 36 respectively and associated orbital propagators 38 and 40. In other words, this determines GPS satellites that could be viewable from the current user satellite orbit position and prospective orientations. The next step 42 determines the line of sight vectors to the GPS satellites and which line of sight vectors are obscured by the earth, that is lines 12 and 20 in FIG. 1. Steps 44 and 46 convert the estimated bore-sight vector into an azimuth and elevation. In step 48, the potentially visible GPS subset 48a is determined from the actual or visible satellites 48b subset, which the GPS receiver 32 has acquired, the invisible GPS subset 48c and the total number of in-service GPS satellites subset 48d. The potentially visible GPS subset comprises the in-service GPS satellites minus the visible GPS subset and the invisible GPS subset. Step 50 determines the GPS antenna direction as a unit vector $\vec{U}_A$ The potentially visible satellite subset consists of all GPS satellites that are not obscured by the earth but are not being tracked by the GPS receiver and the potentially visible GPS satellites of those satellites that could become visible depending on the user spacecraft orientation. If the GPS antenna field of view is represented by angle β (number 11 in FIG. 1), the line-of-sight unit vector to a visible satellite by $\vec{U}_V$, and the line-of-sight unit vector to a potentially visible satellite by $\vec{U}_{PV}$, the antenna bore-sight unit vector $\vec{U}_A$ must satisfy the following set of constraints:

$\vec{U}^t_A \vec{U}_{Vi} > \cos(\beta/2)$ for each element i of the GPS visible subset $\vec{U}^t_A (-\vec{U}_{Vj}) > -\cos(\beta/2)$ for each element j of the GPS potentially visible subset A random search is used to find the GPS antenna direction $\vec{U}_A$ that places it within the constrained region and as far away as possible from the nearest constraint(s).

Once the GPS antenna direction has been determined, a command to roll the vehicle 90 degrees about the satellite's X body axis is supplied to the inertial attitude select/hold mode and the GPS antenna direction ($\vec{U}_{A2}$) is recomputed after maneuver completion.

Two GPS antenna bore-sight unit vectors are now available that are approximately normal. A good estimate of the vehicle's 3-axis attitude can be obtained given these two vector observations plus knowledge that the antenna bore-sight vector is aligned along the spacecraft z body axis. 3 axis attitude determination from the vector observations $\vec{U}_{A_1}$ and $\vec{U}_{A_2}$ is achieved by implementing the following 4 steps:

1. Compute B, where $$B = \left(\frac{1}{2}\right)\begin{bmatrix} 0 \\ 0 \\ -1 \end{bmatrix}\vec{U}^t_{A_1} + \left(\frac{1}{2}\right)\begin{bmatrix} 0 \\ -1 \\ 0 \end{bmatrix}\vec{U}^t_{A_2}$$

2. Compute the singular value decomposition of the matrix B, $B = USV^t$ where U and V are orthogonal matrices, and $$S = \begin{bmatrix} s_1 & 0 & 0 \\ 0 & s_2 & 0 \\ 0 & 0 & s_3 \end{bmatrix}$$

with $s_1 \geq s_2 \geq s_3 \geq 0$

3. Compute d, where $d = (\det U)(\det V) = \pm 1$
4. Compute the direction cosine matrix A, where $$A = U\begin{bmatrix} 1 & 0 & 0 \\ 0 & 1 & 0 \\ 0 & 0 & d \end{bmatrix}V^t$$

The vehicle yaw rotation $\psi = \tan^{-1}(A(1,2)/A(1,1))$

Once an estimate of the spacecraft's yaw attitude (ψ) is obtained, the Attitude Control system mode is switched to cross product steering. The cross product steering control law will compute actuation commands that rotate the vehicle to align the GPS antenna direction along zenith as summarized in FIG. 4. The Attitude Determination System continues to estimate the antenna direction during cross product steering until the GPS antenna is aligned along zenith and the cycle ambiguity resolution problem has been solved.

The antenna bore-sight vector estimation function of the attitude determination system estimates two axis attitude. The accuracy of this two degree of freedom attitude estimate is dependent on the user spacecraft attitude and orbit position.

One skilled in the art may make modifications, in whole or in part, to described embodiment of the invention and its various functions and components without departing from the true scope and spirit of the invention.

What is claimed is:

1. An attitude control for a spacecraft, comprising:
   means for providing stored locations for GPS satellites;
   a GPS antenna;
   means for tracking the OPS satellites;
   means for determining a first GPS antenna bore sight estimation from a characteristic comprising the location of a tracked GPS satellite and OPS satellites that should be tracked;
   means for rotating the spacecraft relative to an antenna bore sight for the GPS antenna;
   means for determining & second antenna bore sight estimation relative to the GPS satellites from said characteristic following said rotation;
   means for determining a desired spacecraft attitude change to point the antenna bore sight in a desired direction, as a function of the first bore sight estimation and the second bore sight estimation, to track satellites that should be tracked within a constrained region required for GPS attitude initialization; and means for changing the spacecraft to said desired attitude.

2. The attitude control of claim 1 wherein said desired direction is the zenith for the GPS antenna.

3. The attitude control of claim 1 wherein the rotation is 90 degrees along the X axis of the satellite.

4. The attitude control of claim 1 wherein the bore eight estimations comprise vectors that manifest azimuth and altitude.

5. A method for aligning the bore sight of a GPS antenna on a spacecraft comprising:

tracking GPS satellites;

determining a GPS satellite that should be tracked;

making a first estimation of the bore sight orientation as a function of the azimuth and elevation between the spacecraft and GPS satellites that are tracked and satellites that are not tracked.

rotating to spacecraft to change the bore sight orientation;

tracking a second set of GPS satellites and determining the remaining GPS satellites that could be tracked;

following rotating the spacecraft, making a second estimation of the bore sight orientation as a function of the azimuth and elevation between the space craft and the second GPS satellite set and a third satellite set that could be tracked;

determining a desired spacecraft attitude to align the antenna bore sight as a function of the first and second estimations of bore sight orientation to track the satellites within a constrained region required for GPS Attitude Initialization; and changing the spacecraft attitude to the desired orientation.

6. A method for controlling the attitude of a spacecraft, comprising:

receiving GPS signals from a first set of satellites;

determining OPS signals from a second set of satellites that are not being received;

making a first estimation of attitude as function of the line of sight bearing between the spacecraft and the first and second set of satellites;

rotating the spacecraft;

receiving GPS signals from a third set of satellites following rotating the spacecraft;

determining GPS signals that are not being received from a fourth set of satellites following rotating the spacecraft;

making a second estimation of attitude as function of the line of sight bearing between the spacecraft and the third and fourth set of satellites; and changing the attitude of the spacecraft to align the GPS antenna bore sight along a desired vector based on the first and second estimations of attitude.

7. The method described in claim 6, wherein the vector is relative to the earth.

8. The method described in claim 7, wherein the vector is inertial space relative.

* * * * *